United States Patent
Garde (10) Patent No.: US 9,533,416 B2
(45) Date of Patent: Jan. 3, 2017

(54) METHOD FOR COMMANDING A MULTI-AXIS ROBOT AND ROBOT FOR IMPLEMENTING SUCH A METHOD

(71) Applicant: STAUBLI FAVERGES, Faverges (FR)

(72) Inventor: Louis Garde, Annecy (FR)

(73) Assignee: STAUBLI FAVERGES, Faverges (FR)

( * ) Notice: Subject to any disclaimer, the term of this patent is extended or adjusted under 35 U.S.C. 154(b) by 0 days.

(21) Appl. No.: 14/678,672

(22) Filed: Apr. 3, 2015

(65) Prior Publication Data
US 2015/0290806 A1 Oct. 15, 2015

(30) Foreign Application Priority Data
Apr. 9, 2014 (FR) ..................... 14 53159

(51) Int. Cl.
*B25J 19/00* (2006.01)
*B25J 9/16* (2006.01)
*H02P 3/16* (2006.01)

(52) U.S. Cl.
CPC ........... *B25J 9/1651* (2013.01); *B25J 19/0004* (2013.01); *H02P 3/16* (2013.01); *Y10S 901/20* (2013.01)

(58) Field of Classification Search
CPC ... B25J 9/1651; B25J 19/0004; B25J 19/1674; Y10S 901/20; H02P 3/16; H02P 3/14; G05B 2219/41279; G05B 2219/41285; G05B 2219/42284
USPC ............ 700/245, 261; 318/362, 375; 901/20
See application file for complete search history.

(56) References Cited

U.S. PATENT DOCUMENTS

| | | | |
|---|---|---|---|
| 6,778,867 B1 * | 8/2004 | Ziegler | B25J 9/1674 318/563 |
| 9,102,058 B2 * | 8/2015 | Hofmann | B25J 19/0004 |
| 2002/0847666 | 7/2002 | Schwesig | |
| 2009/0187277 A1 | 7/2009 | Bird-Radolovic et al. | |

(Continued)

FOREIGN PATENT DOCUMENTS

| | | |
|---|---|---|
| EP | 1857229 A1 | 11/2007 |
| EP | 2631043 A2 | 8/2013 |
| GB | 2387672 A | 10/2003 |

*Primary Examiner* — Dalena Tran
(74) *Attorney, Agent, or Firm* — Dowell & Dowell, PC (57) ABSTRACT

The invention relates to a method for commanding the brakes (F1, F2, F3) of the motors (M1, M2, M3) of a multi-axis robot (R1), comprising:
a robot arm (B) comprising at least two degrees of freedom each associated with an electric motor (M1, M2, M3), a sensor (C1, C2, C3) for measuring movement information, and a brake (F1, F2, F3),
an interfacing unit (4) of the brakes (F1-F3) able to control the supply of electricity to the brakes (F1-F3),
a central processing unit (2),
variable drives (V1, V2, V3) having a torque off function of the motors (M1-M3),
a security system (4, 5),
the method comprising the following successive steps:
6a) selecting a motor (M1-M3),
6b) activating an electric braking function using the selected motor (M1-M3),
6c) opening the brake (F1-F3),
6d) comparing the movement information delivered by the sensor (C1-C3) to a threshold,
6e) closing the brake (F1-F3) when the movement information exceeds the threshold.

15 Claims, 3 Drawing Sheets

(56) References Cited

U.S. PATENT DOCUMENTS

2010/0058850 A1\* 3/2010 Ortmaier ............... B25J 13/085
                                                           73/121
2013/0218332 A1 8/2013 Hofmann \* cited by examiner

METHOD FOR COMMANDING A MULTI-AXIS ROBOT AND ROBOT FOR IMPLEMENTING SUCH A METHOD

BACKGROUND OF THE INVENTION

Field of the Invention

The present invention relates to a method for commanding a multi-axis robot, as well as a robot for implementing such a command method.

Brief Description of the Related Art

It is known to command a multi-axis robot by providing the variable steering drives of its electric motors with command signals generated from a computation unit that determines the trajectory of the robot. The motor of each axis of the robot is equipped with an electromagnetic brake actuated by the computation unit after the controlled stop of the movement on its programmed trajectory, so as to lock the movements of the robot, in order to guarantee the safety of the users and equipment. Once the robot is stopped, the computation unit cuts the motor torque.

It is known from US-A-2002/0084766 to equip the robot with variable drives that control the supply of electricity for the phases of each motor. Each variable drive includes a bridge circuit, which comprises an upper branch equipped with three switchable switches, each connected to a positive bus and to one of the phases of the motor, as well as a lower branch equipped with three additional switchable switches each connected to a negative bus and to one of the phases of the motor.

To allow the emergency stop, the variable drives of US-A-2002/0084766 incorporate a safe torque off function, preventing the switches from switching when it is activated. This function is activated when the command of all of the switches of the two branches of the bridge circuit of a variable drive is neutralized. When a variable drive cuts the power supply of the switches of both branches of the bridge at the same time, this creates a redundancy that makes it possible to improve safety, since the torque will be cut even if a fault occurs resulting in erroneously powering one of the branches of the bridge.

Furthermore, the variable drives make it possible to implement an electric braking function, performed by short-circuiting the phases of the motor that one wishes to brake, i.e., by closing all of the switches of one of the branches of the bridge. The electric braking function is useful to move a moving part of the robot subject to gravity manually in complete safety, since the braking limits the acceleration of the moving part when it is driven downward by its own weight.

When the emergency stop is activated and the user needs to release a brake to move a moving part of the robot, there is then a risk of rapid and uncontrolled movement of that part under the effect of gravity, which is dangerous.

It is necessary to deactivate the torque off function on one of the branches of the bridge to allow activation of the electric braking, so as to reactivate the command switches to close them. This is detrimental to the safety level, since the redundancy introduced by the safe torque off function is then limited, since the switches of one of the branches are no longer neutralized. Standard ISO 10218-1 relative to industrial robots requires a safety level SIL 2 and a redundancy on the emergency stop function. These safety requirements are then no longer met.

SUMMARY OF THE INVENTION

The invention more particularly aims to resolve these drawbacks by proposing a method for commanding a multi-axis robot, as well as a robot for implementing that method, having a simple architecture allowing effective steering, and guaranteeing a high safety level as defined in the standards in force, in particular standard IEC 61508.

To that end, the invention relates to a method for commanding the brakes of the motors of a multi-axis robot, the robot comprising:

a robot arm comprising at least two degrees of freedom each associated with:
   an electric motor,
   a sensor measuring movement information of the degree of freedom,
   a brake able to lock the degree of freedom,
an interfacing unit of the brakes able to control the supply of electricity to the brakes,
a central processing unit able to:
   execute a program for commanding the robot arm,
   determine and send position instructions,
variable drives able to generate, based on the position instructions and movement information, phase power currents of the motors, and having a torque off function of the motors,
a security system able to analyze the movement information, command the brakes and command the torque off function of the motors, the method comprising the following successive steps:
   6a) selecting a motor,
   6b) activating an electric braking function using the selected motor,
   6c) opening the brake associated with the selected motor,
   6d) comparing the movement information delivered by the sensor associated with the selected motor when the latter is performing the electric braking function with a predetermined threshold,
   6e) closing the brake associated with the selected motor when the movement information exceeds the threshold.

Owing to the invention, when the operator wishes to move a moving part of the robot arm manually, he may open a brake safely, since the conditions are met for the motor to be able to brake the moving part electrically owing to the back electromotive force that the manual movement of the moving part generates in the windings of the phases of the short-circuited motor. The operator may also open the brake safely when the robot undergoes an emergency stop.

The security system is connected to the variable drives, so as to perform a torque off function, as well as a system that releases the brakes of the motors, so as to guarantee controlled secure braking safely. The security system is also connected to sensors providing the position, speed and/or acceleration of the motor safely, i.e., in accordance with safety norms. Thus, to perform emergency stop and braking functions, it is not necessary to incorporate specific electronic elements into the variable drives.

According to advantageous but optional aspects of the invention, such a method may incorporate one or more of the following features, considered alone or in any technically allowable combination:
   The movement information consists of positions, speeds and/or accelerations, and, during step 6d), the movement information is compared to thresholds of the same nature.
   The method further comprises a step 2) taking place before step 6a) and consisting of activating the safe torque off function of the motors.

The operator then has double security when the robot is faced with a failure resulting in erroneously supplying a phase of the selected motor with current. Furthermore, the safety level is equivalent to that of a double torque off, since the monitoring of the movement information, in steps 6d) and 6e), detects an untimely reestablishment of the torque following a failure of one branch of the bridge circuit.

The method comprises an additional step 5) consisting of activating a validation member, the deactivation of the validation member causing closing of the brake associated with the selected motor, and the cutoff of the torque of the selected motor.

The validation member allows a safe intervention by the operator, since it must be kept activated throughout the entire opening phase of the brake, and its deactivation places the operator back under safe conditions, since it is followed by closing the brake and securely cutting off the motor torque.

Step 6a) is carried out on a manual command unit connected to the central processing unit.

Step 6a) is carried out on a command unit of the brakes connected to the security system.

Steps 6b), 6c), 6d) and 6e) are carried out by the security system.

When the electric braking function is activated in step 6b), the selected motor performs the electric braking function owing to the back electromotive force that the movement of the robot arm generates in the windings of the short-circuited phases of the motor.

The invention also relates to a robot for carrying out a method for commanding the brakes of the motors of a multi-axes robot, the robot comprising:
  a robot arm comprising at least two degrees of freedom each associated with:
    an electric motor,
    a sensor measuring movement information of the degree of freedom, and
    a brake able to lock the degree of freedom,
  an interfacing unit of the brakes able to control the supply of electricity to the brakes,
  a central processing unit able to:
    execute programs for commanding the robot arm,
    determine and send position instructions for the degrees of freedom,
  variable drives able to generate, based on the position instructions and movement information, feed currents of the phases of the motors, each variable drive incorporating a torque off function,
  a security system able to analyze the movement information, command the brakes and command the torque off function of the motors safely.

The robot comprises a member for releasing the brakes connected to the security system and making it possible to select the motor associated with the brake to be opened. The security system is able to activate an electric braking function using the selected motor. The security system is able to compare the movement information delivered by the sensor associated with the selected motor, when the latter performs the electric braking function, to a predetermined threshold, and to activate closing of the brake associated with the selected motor when the movement information exceeds the threshold.

According to advantageous but optional aspects of the invention, such a multi-axis robot may incorporate one or more of the following features, considered alone or in any technically allowable combination:

The release member of the brakes comprises a validation member, the deactivation of which causes closing of the brake associated with the selected motor.

The validation member allows a safe intervention by the operator, since it must be kept activated throughout the entire opening phase of the brake.

The central processing unit, the variable drives and a safety controller that is part of the security system are grouped together in a cabinet separate from the robot arm.

The security system comprises the interfacing unit of the brakes.

The interfacing unit of the brakes is able to compare the movement information delivered by the sensor associated with the selected motor, when the latter is performing the electric braking function, to a predetermined threshold, and to trigger the closing of the brake associated with the selected motor when the movement information exceeds the threshold.

The release member of the brakes is a housing for releasing the brakes connected to the interfacing unit of the brakes.

The interfacing unit of the brakes is situated in the robot arm.

BRIEF DESCRIPTION OF THE DRAWINGS

The invention will be better understood and other advantages thereof will appear more clearly in light of the following description of a method for commanding a multi-axis robot, as well as a multi-axis robot for implementing such a method, provided solely as an example and done in reference to the appended drawings, in which.

DESCRIPTION OF THE PREFERRED EMBODIMENT

Figure 1:
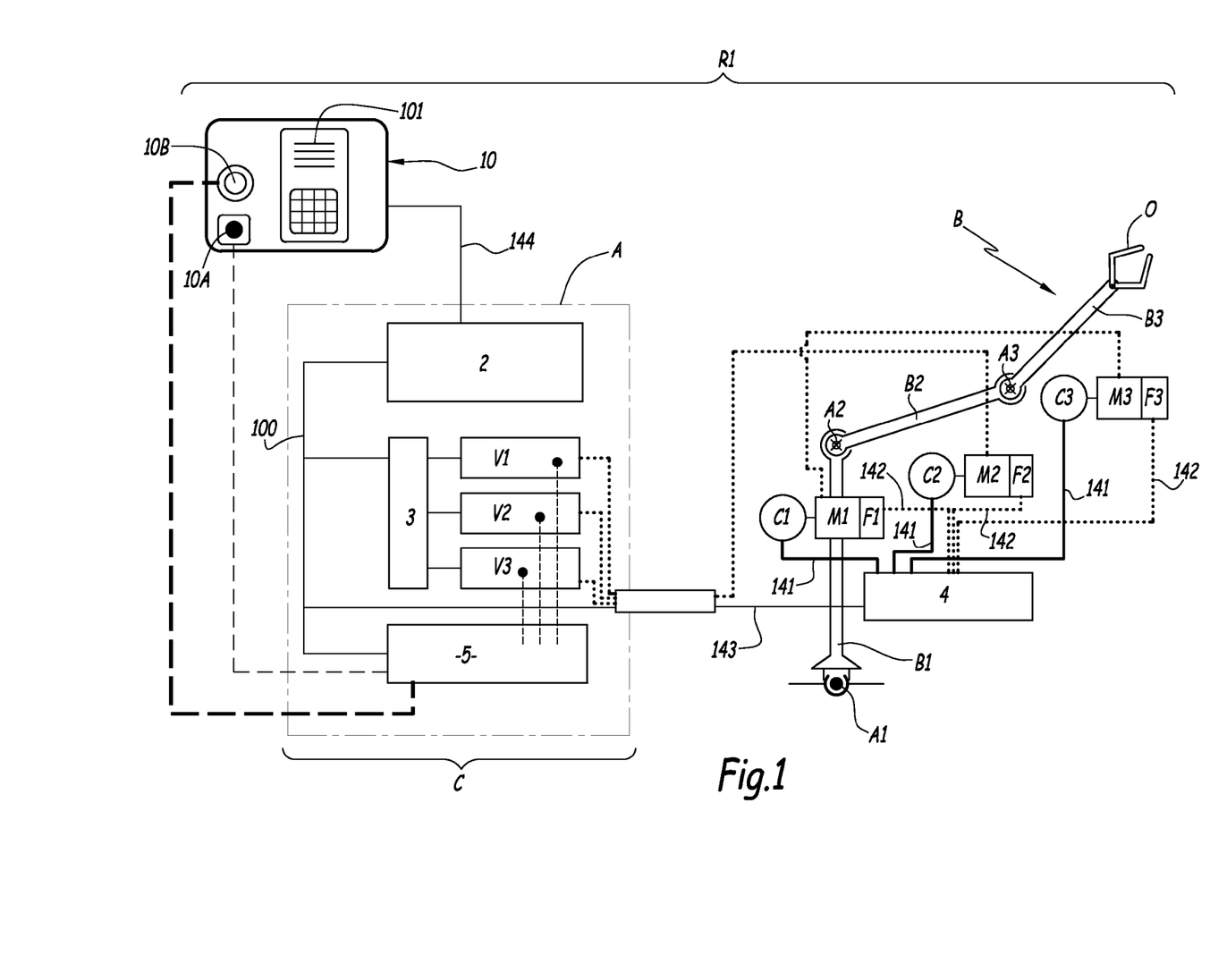
FIG. 1 is a diagrammatic view of a multi-axis robot according to a first embodiment of the invention.

The arm B of the robot R1 shown in FIG. 1 is provided with three degrees of freedom each commanded by a motor M1, M2 or M3 able to move a moving part B1, B2 or B3 of the robot arm B around a geometric axis A1, A2 and A3, to move a tool O in space.

The motors M1 to M3 are shown outside the robot arm B in FIG. 1, but in practice, they are distributed inside the robot arm B, near the articulation axes A1, A2 and A3. The motors M1, M2 and M3 are for example brushless three-phase motors.

Three position sensors or encoders C1, C2 and C3 are distributed in the robot arm B and make it possible to measure movement information relative to the degrees of freedom, for example the angular position of the moving parts B1 to B3 around each of the axes A1 to A3.

Alternatively, the sensors C1 to C3 measure the speed or acceleration of the moving parts, or a combination of movement information from among the position, speed and acceleration.

Each motor M1, M2 and M3 cooperates with an electromagnetic brake F1, F2 or F3, which, when supplied with electricity, allows the rotation of the rotor of each motor M1, M2 and M3. By default, when there is no electric current, the brakes F1, F2 and F3 lock the rotors of the motors M1 to M3, which promotes safety since, in case of current cutoff, the motors M1 to M3 are braked.

An interfacing unit 4 of the sensors C1, C2 and C3 and the brakes F1, F2 and F3 is connected to each sensor C1, C2 and C3 by a secure dedicated digital link 141. In the example shown in FIG. 1, the interfacing unit 4 is incorporated into the robot arm B and is positioned outside an enclosure or cabinet A that contains a control unit C separated from the robot arm B.

The interfacing unit 4 is connected to each brake F1, F2 and F3 by a wired link 142 and comprises a computation unit that steers the supply of electric current to the brakes F1, F2 and F3, so as to open and close them. The computation unit of the interfacing unit 4 is able to process the signals delivered by the sensors C1, C2 and C3 by reconditioning them according to the EtherCAT protocol to make them accessible to the control unit C.

A link 143 extending from the robot arm B to the control unit C connects the interfacing unit 4 to a shared bus 100. The shared bus 100 makes it possible to transfer the electric signals between the robot arm B and the control unit C. The interfacing unit 4 makes it possible to serialize the information coming from the sensors C1 to C3 and the brakes F1 to F3, then to make them move toward the shared bus 100.

The shared bus 100 is an Ethernet real-time bus that operates according to the EtherCAT protocol and connects a central processing unit 2, a security controller 5, a control card 3 for the variable drives V1, V2 and V3 and the interfacing unit 4 to each other.

The central processing unit 2 is positioned in the cabinet A and comprises a computation unit able to execute programs for commanding the robot arm B, and to compute position instructions for each moving part B1 to B3 of the robot arm B. These position instructions are sent over the shared bus 100 and made available to the control card 3.

A release member of the brakes F1, F2 and F3, i.e., a manual command unit 10, is positioned outside the cabinet A and is connected to the central processing unit 2 by an EtherNET link 144. The manual command unit 10 [is] connected to the security controller 5 via the central processing unit 2. The EtherNET link 144 connects the manual command unit 10 to the central processing unit 2, which is connected to the security controller 5 by the shared bus 100. The manual command unit 10 comprises a communication interface 101, for example a keyboard and display screen, that allows an operator to send command orders to the robot R1, and to receive information relative to the operation of the robot R1, such as the positions of the moving parts B1, B2 or B3. The manual command unit 10 makes it possible to select a manual operating mode of the robot R1, in order to move a moving part B1, B2 or B3 of the robot arm B manually if needed, for example during a trajectory learning phase, for a maintenance operation, or, following an emergency stop, to reposition the robot arm B in an appropriate position.

The manual command unit 10 has an emergency stop button 10A and a failsafe contact 10B, which are cabled directly to the security controller 5.

The failsafe contact 10B constitutes a validation member that is deactivated by default, including a command button that must be activated manually to allow opening of the brakes F1 to F3. When the operator wishes to open a brake F1 to F3, he must manually activate the failsafe contact 10B by keeping the command button pushed in throughout the entire opening duration of the brakes F1 to F3, which increases the safety level by avoiding accidental unlocking of the brakes. The deactivation of the failsafe contact 10B causes closing of the brake F1, F2 or F3 associated with the motor M1, M2 or M3 selected using the communication interface 101.

The security controller 5 is designed to ensure safe operation of the robot R1. It is connected to the shared bus 100 and receives the movement information relative to the degrees of freedom. It has a computation unit that allows it to execute monitoring programs of the robot R1. For example, it may detect the failure of a sensor from among the sensors C1, C2 and C3 and command the stop of the robot R1 following detection of the failure.

As explained in more detail below, the security controller 5 is able to analyze the movement information supplied by the sensors C1, C2 and C3 and to steer the brakes F1, F2 and F3. The security controller 5 is connected to the variable drives V1, V2 and V3 to be able to activate a torque off function of the motors M1, M2 and M3 directly.

The security controller 5 is able to compare the movement information of the degree of freedom selected using the manual command unit 10 to predetermined thresholds, then to trigger closing of the corresponding brake F1, F2 or F3 based on the result of the comparison. The security controller 5 thus performs a secure braking function, from movement information of the degrees of freedom made accessible by the shared bus 100.

The control card 3 of the command unit C is directly connected to the shared bus 100 and to each variable drive V1, V2 and V3. The control card 3 develops the current instructions for the variable drives V1, V2 and V3 based on instructions supplied by the central processing unit 2 and movement information for the degrees of freedom. The control card 3 has information relative to the angular position of each moving part B1, B2 and B3 using the connection to the shared bus 100. It is connected to the variable drives V1, V2 and V3 from which it receives status information, such as the activation of the torque off function.

The variable drives V1, V2 and V3 are able to generate supply currents in the phases of the motors M1, M2 and M3 based on current instructions and movement information for the degrees of freedom. They each incorporate a bridge circuit supplying electricity for the phases of the motors M1, M2 and M3 and making it possible both to guarantee a torque off and to perform the electric braking function using the motors M1 to M3.

Figure 2:
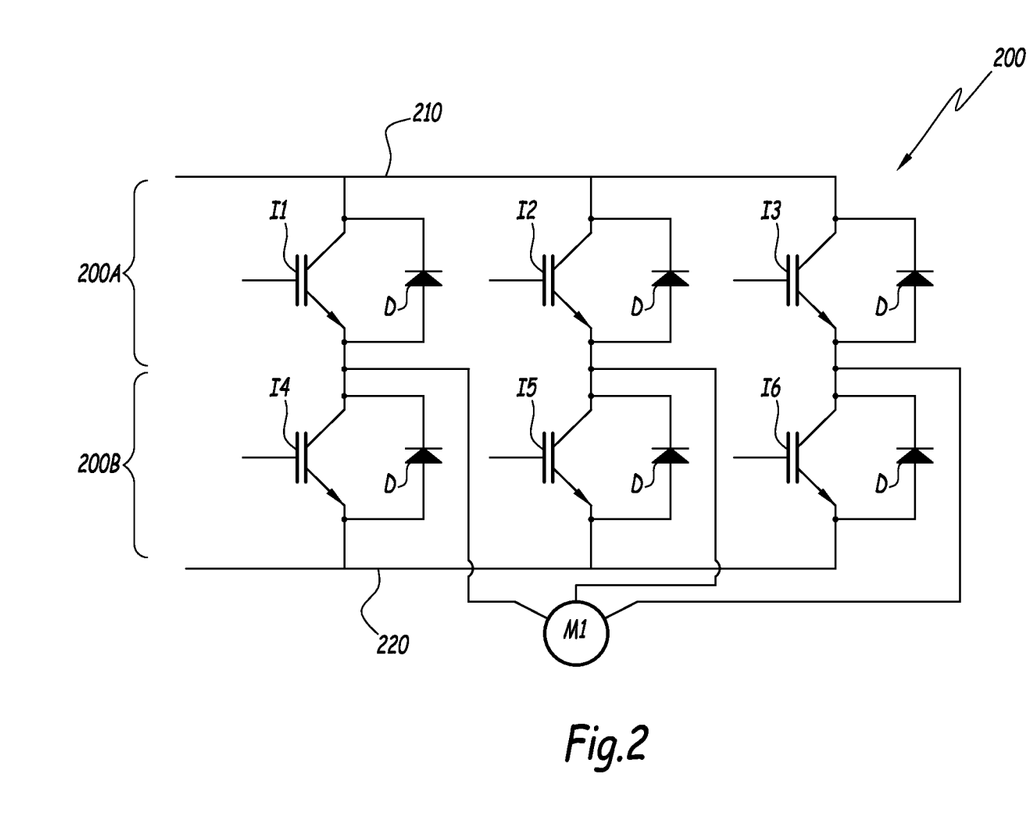
FIG. 2 is a diagram of an electric circuit that is part of the robot of FIG. 1.

The bridge circuit 200 shown in FIG. 2, and which belongs to the variable drive V1 associated with the motor M1, will be described below, with the understanding that similar circuits are incorporated into the variable drives V2 and V3 associated with the motors M2 and M3. The circuit 200 comprises a first branch 200A grouping together three switches I1, I2 and I3 each formed by an IGBT transistor, the base of which is steered by the variable drive V1. The collector of each switch I1, I2 and I3 is connected to a positive bus 210 and a freewheeling diode D connects the collector to the transmitter of each switch. A second branch 200B of the circuit 200 groups together three switches I4, I5 and I6 each formed by an IGBT transistor, the base of which is steered by the variable drive V1. The transmitter of each switch I4, I5 and I6 is connected to a negative bus 220 and a freewheeling diode D connects the collector to the transmitter of each switch. The transmitter of each switch I1, I2 and I3 is respectively connected to the collector of the switch I4, I5 or I6 and one of the phases of the motor M1.

The control card 3 is configured to automatically command the closing of the switches I1, I2 and I3 or I4, I5 and I6 of a branch 200A or 200B of the bridge circuit 200 of a variable drive V1, V2 or V3 whereof the torque off function has been deactivated, whereas it remains activated on the other branch 200B or 200A of the bridge circuit 200. The security controller 5 is then able to drive an electric braking function using the motors M1, M2 and M3.

The torque off function is effective once the command of all of the switches of at least one of the branches 200A and/or 200B of the bridge 200 is neutralized, so as to prevent them from switching. This neutralization is obtained by cutting the power supply of the switches I1, I2, I3 and/or I4, I5, I6. When the power supply of the switches I1 to I6 of the two branches 200A and 200B of the bridge 200 is cut at the same time, a so-called "safe" torque off is done because it creates a redundancy that allows improved security, since the torque remains off even if the neutralization of the switching of the switches of one of the branches 200A or 200B is faulty. The variable drives V1, V2 and V3 activate the electric braking function by short-circuiting the phases of the motor M1, M2 or M3, i.e., the closing all of the switches of one of the branches 200A or 200B of the bridge. When the electric braking function is activated, the back electromotive force of the selected motor M1, M2 or M3 then brakes the movement of the corresponding moving part B1, B2 or V3, when the operator moves it manually.

During operation, when the operator actuates the emergency stop 10A in a step 1), the computation unit 2 stops the robot arm B along its trajectory by developing corresponding position instructions and sending them to the control card 3 in a step 2). The security controller 5 then gives the order to close the brakes F1 to F3 in a step 3). Then, in a step 4), the security controller 5 gives the order to the variable drives V1 to V3 to neutralize the command of all of the switches I1 to I6 of those branches 200A and 200B of the three bridge circuits 200. Inasmuch as the two branches 200A and 200B of each bridge circuit 200 are neutralized, a redundancy is introduced, which makes it possible to improve safety, since the torque will be cut off even if a fault occurs resulting in erroneously powering one of the branches of the bridge circuit 200.

The robot arm B is then safely immobilized.

When the operator wishes to release a brake F1, F2 or F3 to move a part B1, B2 or B3 of the robot arm B manually, he keeps the failsafe contact 10B of the manual command unit 10 pushed in, beforehand and throughout the entire procedure, in a step 5).

During a step 6a), the operator next uses the communication interface 101 to select the manual operating mode, as well as the motor M1 to M3 associated with the brake F1 to F3 that he wishes to release in order to move the moving part B1, B2 or B3 manually. This instruction is sent to the central processing unit 2, which informs the security controller 5 that the selected brake F1, F2 or F3 will be opened. In return, the safety controller 5 confirms to the central processing unit 2 that the brake F1 to F3 be released is in fact selected.

Then, in a step 6b), the security controller 5 deactivates the torque off function on one of the branches 200A or 200B of the selected bridge circuit 200. The control card 3 detects this deactivation and closes the switches I1, I2, I3 or I4, I5, I6 of the branch 200A or 200B to allow short-circuiting of the phases of the selected motor M1, M2 or M3. As a result, the security controller 5 activates the electric braking function performed by the motor M1, M2 or M3.

Then, in step 6c), the security controller 5 commands the opening of the brake F1, F2 or F3 associated with the selected motor M1 to M3, via the interfacing unit 4, which supplies electric current to the selected brake F1, F2 or F3. The moving part B1 to B3 associated with the selected motor M1 to M3 is then free to be moved manually, while being braked in its movement by the back electromotive force that the manual movement of the moving part B1, B2 or B3 generates in the windings of the phases of the short-circuited motor M1, M2 or M3.

The electric braking done by short-circuiting the phases of the motor M1, M2 or M3 may sometimes be insufficient to counter the effects of gravity, which may cause the moving part B1, B2 or B3 to move quickly, which is dangerous.

To avoid rapid movement of the moving part B1, B2 or B3, the method comprises a step 6d) following step 6c), in which the security controller 5 continuously compares the movement information supplied by the sensor C1 to C3 associated with the selected motor M1, M2 or M3 to a predetermined threshold. The threshold is of the same nature as the movement information, i.e., the property measured by the sensor C1 to C3 is of the same type as the threshold. For example, if the threshold is an angular speed, then the computation unit of the security controller 5 performs a mathematical derivation of the position of the rotor of the selected motor M1, M2 or M3, supplied by the sensor C1 to C3, in order to calculate an angular speed.

Alternatively, the threshold combines movement information of different natures, for example a position and a speed.

In step 6e), once the movement information exceeds the threshold, the security controller 5 closes the brake F1, F2 or F3 by commanding the cutoff of the electricity supply of the brake, via the interfacing unit 4.

Step 6e) allows the operator to benefit from an active safety level, since the robot R1 closes the brake F1 to F3 itself in case of unwanted rapid movement.

Once the brake F1 to F3 is closed and in a step 6f), the security controller 5 reactivates the safe torque off function on both branches 200A and 200B of the bridge circuit 200, in order to once again provide an optimal safety level.

Alternatively, steps 6e) and 6f) may be performed simultaneously.

Figure 3:
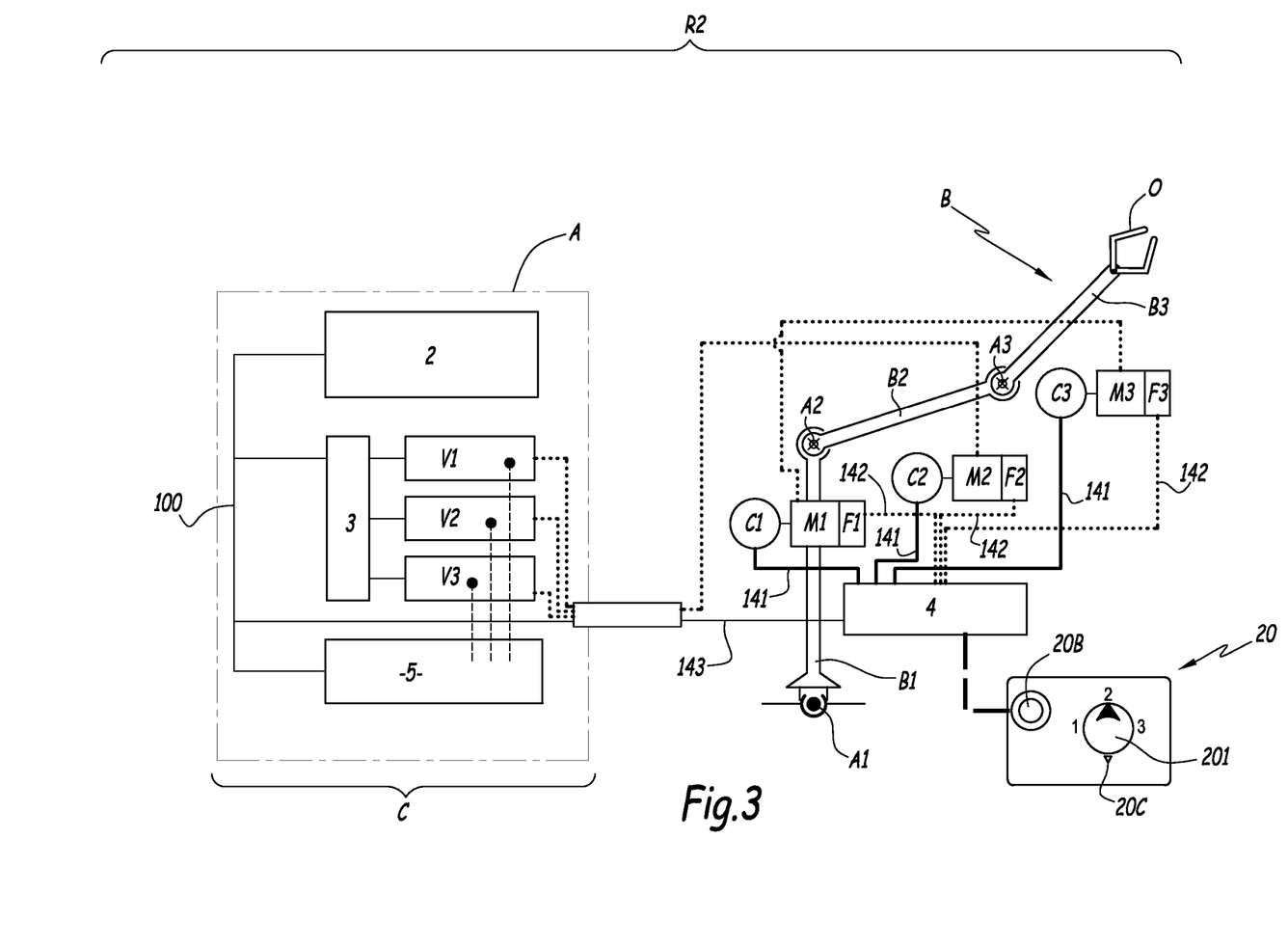
FIG. 3 is a diagrammatic view of a multi-axis robot according to a second embodiment of the invention.

FIG. 3 shows a second embodiment of the robot R2 according to the invention, which differs from the robot R1 in that it comprises a release member of the brakes, i.e., a command member of the brakes 20 positioned outside the cabinet A, near the robot arm B. Hereinafter, the elements of the robot R2 that are similar to those of the robot R1 are not described again, and they bear the same numerical references.

The housing 20 is connected to the interfacing unit 4 and comprises an interface 201 for selecting a brake F1 to F3, for example a rotating button having three positions each corresponding to the selection of a brake F1, F2 or F3 or the motor M1 to M3 associated with that brake.

The interface 201 allows the operator to select the moving part B1 to B3 that he wishes to move manually, by activating the electric braking function performed by the corresponding motor M1 to M3, owing to the back electromotive force that the manual movement of the selected moving part B1, B2 or B3 generates in the windings of the phases of the short-circuited motor M1, M2 or M3.

The command unit of the brakes 20 has a failsafe contact 20B, which is directly cabled to the interfacing unit 4. In other words, no member is interposed between the failsafe contact 20B on the one hand and the interfacing unit 4 on the other hand. The interface 201 comprises a pushbutton 20C for opening the selected brake F1, F2 or F3.

The interfacing unit 4 further comprises a computation unit able to execute independent monitoring routines, in order to ensure safe braking without biasing the safety controller 5. The interfacing unit is therefore able to perform steps 6d) and 6e).

When the operator uses the command unit of the brakes 20 when he wishes to release a brake F1, F2 or F3 to move a moving part B1, B2 or B3 of the robot arm B manually, he must first and throughout the entire procedure, keep the failsafe contact 20B of the command unit of the brakes 20 pushed in.

The operator uses the button 201 to select the degree of freedom to be released, i.e., the brake F1 to F3 to be opened. This instruction is sent to the interfacing unit 4, which sends the information to the central processing unit 2.

The operator uses the button 20C to command the opening of the brake F1, F2 or F3, while keeping the failsafe contact 20B pushed in. The interfacing unit 4 then orders the security controller 5 to deactivate the torque off function on one of the branches 200A or 200B of the bridge circuit 200 associated with the selected brake F1, F2 or F3, which results in activating the electric braking function using the selected motor M1 to M3, owing to the back electromotive force that the manual movement of the selected moving part B1, B2 or B3 generates in the windings of the short-circuited phases of the selected motor M1, M2 or M3. The operator can then move the moving part B1, B2 or B3 completely safely.

In the example of FIG. 3, the robot R2 does not comprise a manual command unit. Alternatively, the robot R2 may comprise, in addition to the command unit of the brakes 20, a manual command unit similar to the manual command unit 10 of the robot R1.

The command method of the robot R2 is then similar to the method described in reference to the robot R1 if the operator uses the manual command housing 10.

The invention is not limited to a robot with three axes such as the robot R1 or R2. The invention may apply to a robot with at least two axes. For example, the invention may apply to a Cartesian robot with two linear axes, a SCARA robot with four axes or a robot articulated to six axes. At least one of the axes may have a translational movement.

The robots R1 and R2 command the motors M1, M2 and M3 owing to the central processing unit 2 and the control card 3. Alternatively, the command of the motors M1, M2 and M3 is done by a single member connected to the variation drives V1, V2 and V3, which replaces the central processing unit 2 and the control card 3.

The robots R1 and R2 comprise both an interfacing unit 4 and a security controller 5, which are separate, i.e., the interfacing unit 4 is incorporated into the robot arm B, while the security controller 5 is housed in the cabinet A. The security controller 5 is part of a security system that also comprises the interfacing unit 4.

Alternatively, the interfacing unit 4 and the security controller 5 are physically joined on a same electronic card, which constitutes a single security system that is connected to the variation drives V1 to V3.

The presence of the interfacing unit 4 in the robot arm B is optional and makes it possible to simplify the link between the robot arm B and the control unit C. In that case, the security controller 5 alone constitutes the security system.

In the context of the invention, the described embodiments and alternatives may be combined with each other, in whole or in part.

The invention claimed is:

1. A method for commanding brakes of motors of a multi-axis robot, the robot including:
    a robot arm including at least two degrees of freedom each associated with:
        an electric motor,
        a sensor measuring movement information of a degree of freedom,
        a brake for locking the degree of freedom,
    an interfacing unit of the brakes for controlling a supply of electricity to the brakes,
    a central processing unit for:
        executing a program for commanding the robot arm, determining and sending position instructions,
    variable drives for generating, based on the position instructions and movement information, phase power currents of the motors, and having a torque off function of the motors,
    a security system for analyzing the movement information, command the brakes and command the torque off function of the motors, the method comprising the following successive steps:
    6a) selecting a motor,
    6b) activating an electric braking function using the selected motor,
    6c) opening the brake associated with the selected motor, the method wherein further comprises the following steps:
    6d) comparing the movement information delivered by the sensor associated with the selected motor when the selected motor is performing the electric braking function with a predetermined threshold,
    6e) closing the brake associated with the selected motor when the movement information exceeds the predetermined threshold.

2. The method according to claim 1, wherein the movement information consists of positions, speeds and/or accelerations, and, during step 6d), the movement information is compared to corresponding thresholds of position, of speed and/or of accelerations.

3. The method according to claim 1, wherein the method further includes a step 2) taking place before step 6a) and consisting of activating the safe torque off function of the motors.

4. The method according to claim 1, wherein the method includes an additional step 5) consisting of activating a validation member, the deactivation of the validation member causing closing of the brake associated with the selected motor, and the cutoff of the torque of the selected motor.

5. The method according to claim 1, wherein step 6a) is carried out on a manual command unit connected to the central processing unit.

6. The method according to claim 1, wherein step 6a) is carried out on a manual command unit of the brakes connected to the security system.

7. The method according to claim 1, wherein steps 6b), 6c), 6d) and 6e) are carried out by the security system.

8. The method according to claim 1, wherein when the electric braking function is activated in step 6b), the selected motor performs the electric braking function owing to a back electromotive force that the movement of the robot arm generates in windings of short-circuited phases of the motor.

9. A robot for implementing a method for commanding the brakes of the motors of a multi-axis robot, the robot comprising:
    a robot arm including at least two degrees of freedom each associated with:
        an electric motor,
        a sensor measuring movement information of a degree of freedom, and
        a brake for locking the degree of freedom,
    an interfacing unit of the brakes for controlling a supply of electricity to the brakes,
    a central processing unit able for:
        executing programs for commanding the robot arm, determining and sending position instructions for the degrees of freedom, variable drives for generating, based on the position instructions and movement information, feed currents of phases of the motors, each variable drive incorporating a torque off function, a security system to analyze the movement information, command the brakes and command the torque off function of the motors, wherein:

the robot includes a release member for releasing the brakes connected to the security system and making it possible to select a motor associated with a brake to be opened, the security system activates an electric braking function using the selected motor, and the security system is compares the movement information delivered by the sensor associated with the selected motor, when the selected motor performs the electric braking function, to a predetermined threshold, and to activate closing of the brake associated with the selected motor when the movement information exceeds a threshold.

10. The robot according to claim 9, wherein the release member of the brakes includes a validation member, the deactivation of which causes closing of the brake associated with the selected motor.

11. The robot according to claim 9, wherein the central processing unit, the variable drives and a safety controller that is part of the security system are grouped together in a cabinet separate from the robot arm.

12. The robot according to claim 9, wherein the security system includes the interfacing unit of the brakes.

13. The robot according to claim 12, wherein the interfacing unit is able to compare the movement information delivered by the sensor associated with the selected motor, when the selected motor performs the electric braking function, to a predetermined threshold, and to activate closing of the brake associated with the selected motor when the movement information exceeds the threshold.

14. The robot according to claim 13, wherein the release member of the brakes is a housing for releasing the brakes connected to the interfacing unit of the brakes.

15. The robot according to claim 14, wherein the interfacing unit of the brakes is situated in the robot arm.

* * * * *